(No Model.)　　　　　　　　　　　　　　　　　　3 Sheets—Sheet 1.
O. MENGELBIER.
BATTERY FOR DRAWING OFF AND LIQUORING MASSE CUITE.
No. 533,545.　　　　　　　　　Patented Feb. 5, 1895.

Witnesses:　　　　　　　　　　　Inventor
　　　　　　　　　　　　　　　Oscar Mengelbier (No Model.)  3 Sheets—Sheet 2.

O. MENGELBIER.
BATTERY FOR DRAWING OFF AND LIQUORING MASSE CUITE.

No. 533,545. Patented Feb. 5, 1895.

(No Model.) 3 Sheets—Sheet 3.
O. MENGELBIER.
BATTERY FOR DRAWING OFF AND LIQUORING MASSE CUITE.
No. 533,545. Patented Feb. 5, 1895.

Witnesses:
Inventor:
Oscar Mengelbier
by Henry Connett
his Attorney

UNITED STATES PATENT OFFICE.

OSCAR MENGELBIER, OF PENCO, CHILE.

BATTERY FOR DRAWING OFF AND LIQUORING MASSE-CUITE.

SPECIFICATION forming part of Letters Patent No. 533,545, dated February 5, 1895.

Application filed August 12, 1893. Serial No. 483,017. (No model.) Patented in Germany April 28, 1893, No. 72,386; in France May 13, 1893, No. 220,423; in England June 23, 1893, No. 12,359, and in Austria-Hungary May 13, 1894, No. 26,719 and No. 64,535.

*To all whom it may concern:*

Be it known that I, OSCAR MENGELBIER, a subject of the Emperor of Germany, and a resident of Penco, in the Republic of Chile, have invented certain Improvements in Batteries for Sucking Off and Liquoring Masse-Cuite, (for which patents have been granted in Germany, No. 72,386, dated April 28, 1893; in France, No. 220,423, dated May 13, 1893; in Austria-Hungary, No. 26,719 and No. 64,535, dated May 13, 1894, and in Great Britain, No. 12,359, dated June 23, 1893,) of which the following is a specification.

This invention relates in general to the clarifying of sugar and in particular to a battery or like apparatus which serves for sucking off and liquoring masse cuite, and is an improvement on the battery described in my United States Patent No. 505,118, dated September 19, 1893. This battery is so arranged that the cleare can be used in an exactly measured and regulated quantity for each mold as required for each boiling operation, and the unequal distribution of the cleare in each mold by reason of irregular operation of the single molds during the liquoring, is thus obviated. According to one form of the battery, the arrangement is such, that the single elements or molds can be cut out when required. It is possible with this apparatus to reduce the quantity of liquor necessary for liquoring the impure masse cuite, and thus to increase the capacity of the centrifugal drying machine. The apparatus can also be employed for sucking off the green sirup and for working with pure liquor.

I will now describe my invention with reference to the accompanying drawings, in which—

Figure 1:
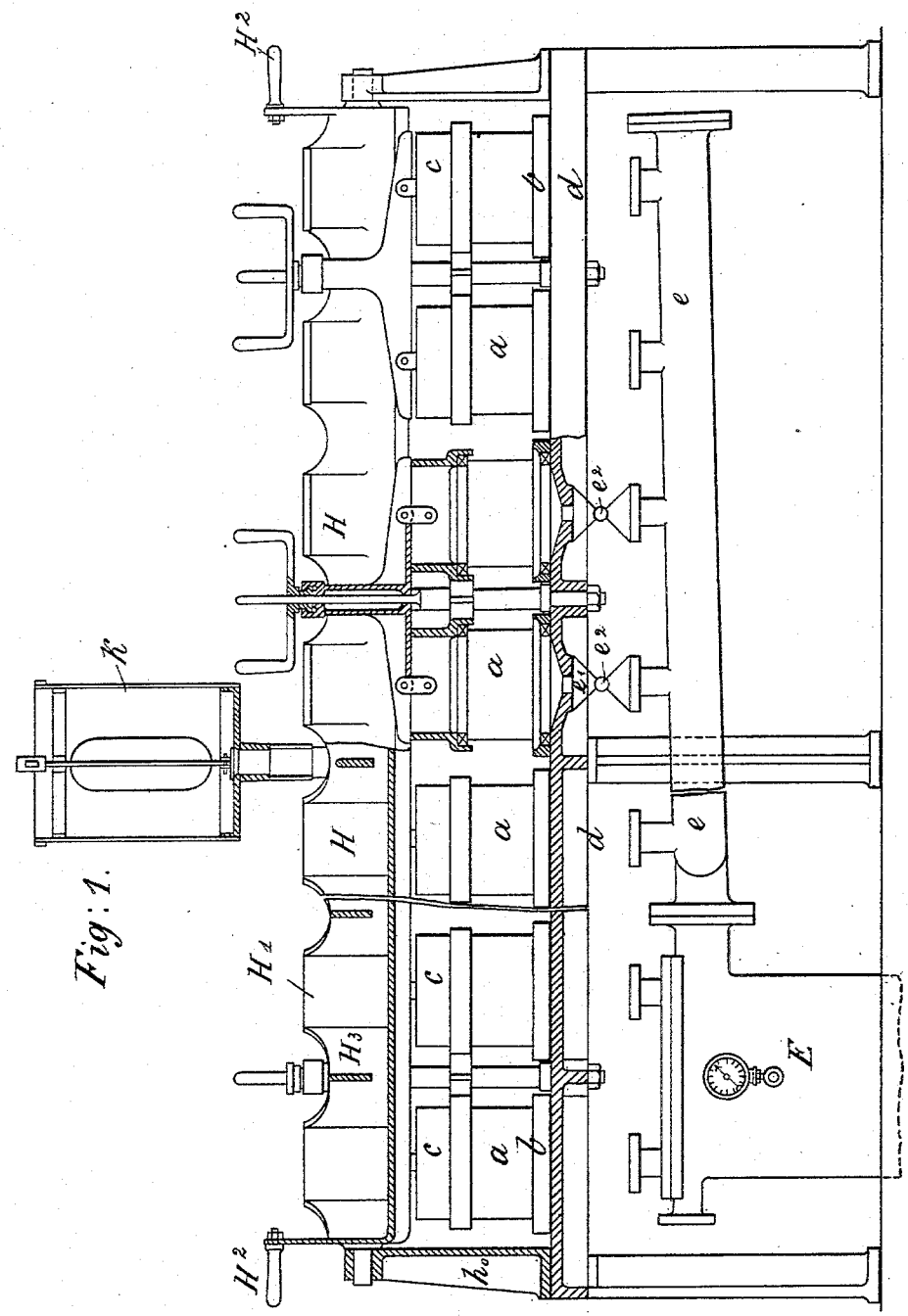
Figure 2:
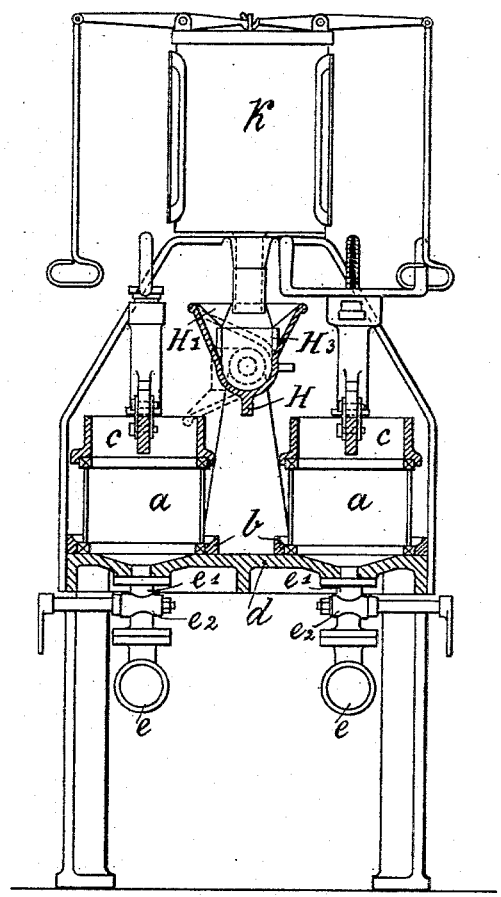
Figure 3:
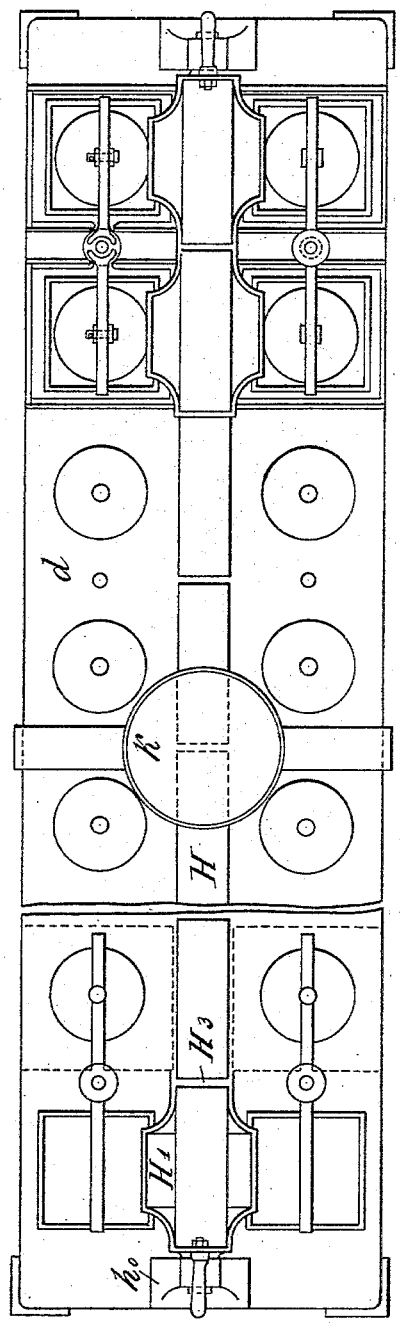

Figure 1 is a side elevation of the battery, partly in vertical section. Fig. 2 is a vertical transverse section of the battery. Fig. 3 is a plan view with parts in different horizontal planes, of the battery.

The symmetrical arrangement of the battery to the central axis is similar to that described in my said Patent No. 505,118, so far as regards the arrangement of the single elements of the battery.

In the present construction the cups or suction boxes are substituted by rings $b$, whose packings can be placed immediately on the table or plate $d$, receiving a pipe $e'$ with cock $e^2$ for each mold. The single cocks connect with the pipes $e$ on each side of the battery leading to the closed receptacle E, from which the air is exhausted. The plate or table $d$ preferably inclines toward each pipe $e'$ in the form of a funnel, as seen in Fig. 1.

According to the construction shown the hoods for the several sugar molds $a$ are not in connection with the device common to all the molds for distributing the cleare. The conveying and uniform distributing of the cleare from the liquor measuring vessel K, after opening the bottom valve, are effected by an open conduit H, which can be rocked or tilted to one or the other side on trunnions mounted in the frame $h^0$, by means of a handle $H^2$. If the cleare necessary for liquoring all the elements of the battery is run from the liquor-measuring vessel K on one side into the conduit H, the latter will be tilted to the corresponding side (see dotted lines in Fig. 2) and consequently the contents of the conduit will be discharged by spouts $H'$ into the hoods $c$ of the elements of the battery, the partitions $H^3$ uniformly dividing or separating the corresponding quantity of the cleare for each hood. By tilting the conduit in the same manner to the opposite side, the cleare will be correspondingly distributed or fed to each hood. The liquoring operation is completed after the said distribution of the cleare to every element of the battery has been effected, in such way, that by the suction pipe $e$ connecting the elements of the one side, the cleare is sucked through the impure mass in the molds and then refined in a well known manner.

The shape or size of the molds for the masse cuite may be varied and their form is not essential to this invention. The tight closing of the hoods against the molds and the tightening of same against the rings $b$, or plate $d$ of the table, is effected by means of clamps or bows, similar to those employed in my previously mentioned application, but in such manner that one bow or clamp serves for tightening and closing several molds.

Having thus described my invention, I claim—

1. In a battery for use in liquoring masse cuite, the combination with a series of molds $a$, provided each with a hood $c$, the plate $d$ on which the molds are mounted, and a pipe $e$, below the molds and connected therewith in common, of vessel K, for the cleare arranged above the level of the molds, and a rocking partitioned conduit for the cleare, said conduit being arranged to receive the cleare and convey it to the several molds, substantially as set forth.

2. In a battery for use in sucking off and liquoring masse cuite, the combination with two parallel series of molds $a$, each provided with a hood $c$, the plate $d$ upon which the molds are mounted, pipes $e$, connected each with a series of molds from below, the vessel K, arranged above the level of the molds, and a conduit H, mounted in rocking bearings below the vessel K, said conduit having partitions $H^3$, and spouts $H'$ arranged between the partitions and opposite to the respective molds, whereby, when the conduit is filled from the vessel K and tilted in either direction, the contents will flow into the molds, as set forth.

In witness whereof I have hereunto signed my name in the presence of two subscribing witnesses.

OSCAR MENGELBIER.

Witnesses:
GUSTAV TAUER,
ALFRED MEISTER.